United States Patent [19]
Laughlin

[11] Patent Number: 5,452,873
[45] Date of Patent: Sep. 26, 1995

[54] BOX SUPPORT

[75] Inventor: Raymond S. Laughlin, Cuyahoga Falls, Ohio

[73] Assignee: Erico International Corporation, Solon, Ohio

[21] Appl. No.: 567,636

[22] Filed: Aug. 15, 1990

[51] Int. Cl.[6] .................................................. A47B 96/00
[52] U.S. Cl. .................... 248/205.1; 248/906; 220/3.9
[58] Field of Search ..................................... 248/906, 300, 248/205.1, 57; 220/3.9, 3.3

[56] References Cited

U.S. PATENT DOCUMENTS

| | | | |
|---|---|---|---|
| 1,814,449 | 7/1931 | Morgenstern | 220/309 |
| 2,501,781 | 3/1950 | Meagher | 248/300 X |
| 3,088,620 | 5/1963 | Crawford | 248/300 X |
| 4,084,778 | 4/1978 | Dominguez | 248/300 X |
| 4,108,414 | 8/1978 | Grant, Sr. | 248/300 |
| 4,533,060 | 8/1985 | Medlin | 220/3.9 |
| 4,943,022 | 7/1990 | Rinderer | 248/906 X |
| 4,957,251 | 9/1990 | Hubbard | 248/300 X |
| 4,978,092 | 12/1990 | Nattel | 248/906 X |

Primary Examiner—Alvin C. Chin-Shue
Attorney, Agent, or Firm—Renner, Otto, Boisselle & Sklar

[57] ABSTRACT

A box bracket for stud wall construction is formed from a single sheet metal strap which has one major transverse right angle bend forming a vertical leg and a horizontal leg or arm with the vertical leg having a vertical offset overlapping the face of the stud while the horizontal arm extends in a horizontal plane over the top or bottom of the box and abuts the far wall panel. The horizontal and vertical legs are offset and the vertical leg is provided with a 45° gusset or panel which includes a keyhole opening and a slot, to each of which a different size box and plaster ring may be mounted. The vertical leg includes two spaced edge tabs or flanges between which a vertical edge of the box is grasped. The horizontal leg or arm includes an interior stiffening flange and an exterior U-shape knock-out opposite the flange. The knock-out would normally block one of the knock-outs in the box. If such knock-out is employed, then the fitting used for the electrical-conduit will clamp the horizontal leg to the box improving rigidity. The horizontal arm also has a series of pairs of short transverse slots which enable the distal end of the leg to be field bent to form a downturned flange at three different locations corresponding to the depth of a stud.

19 Claims, 2 Drawing Sheets

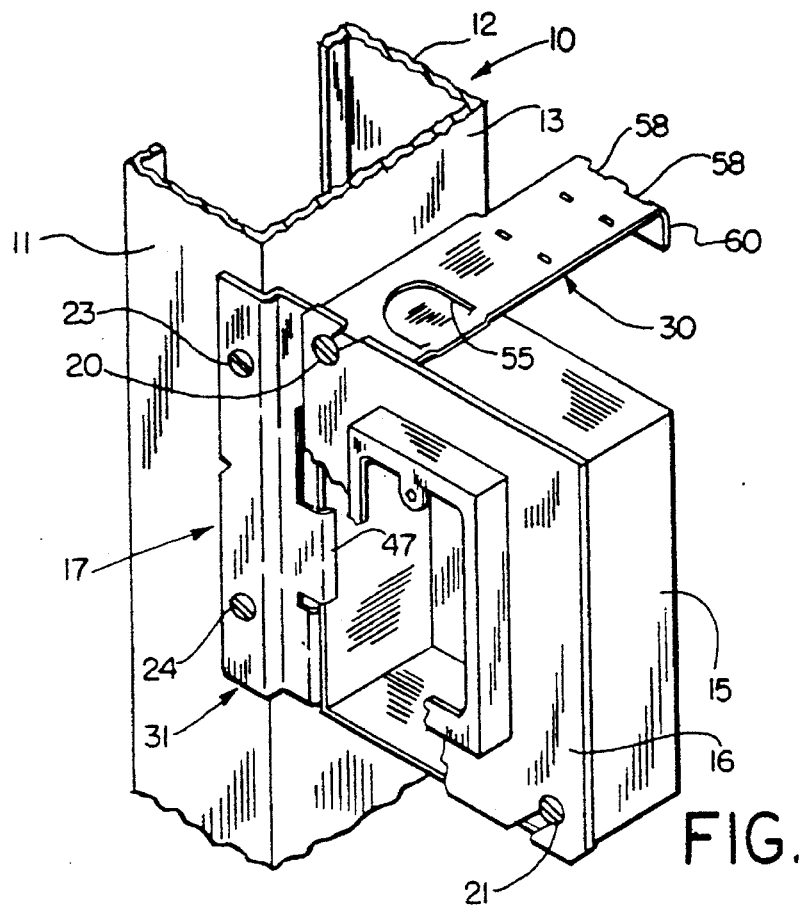
FIG. 1
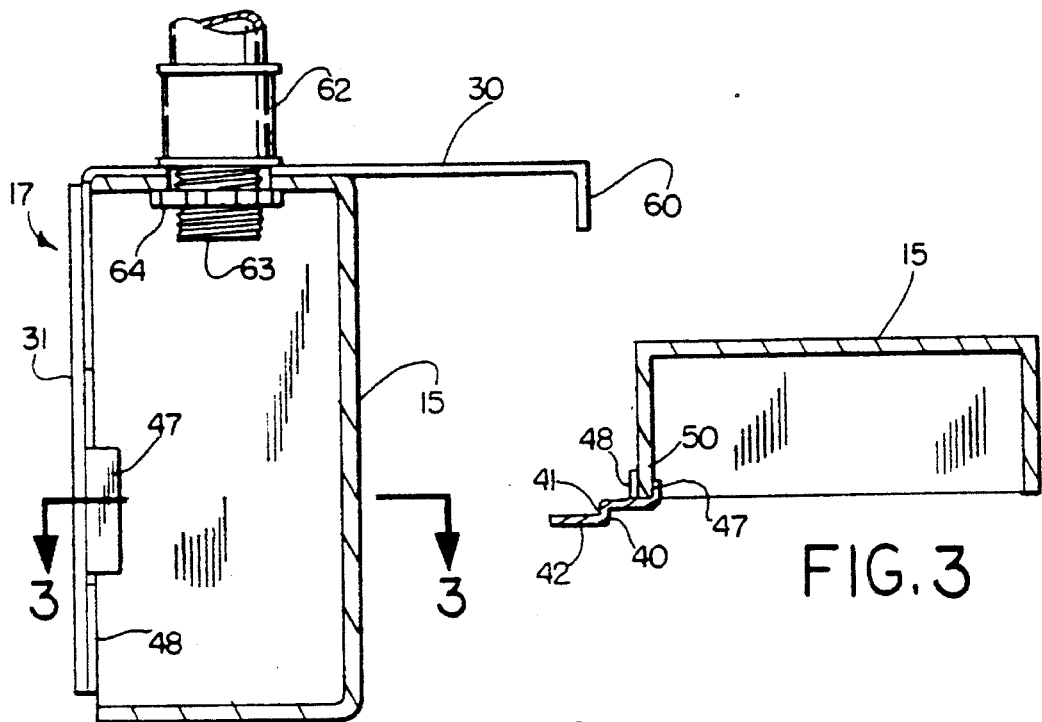
FIG. 2
FIG. 3

BOX SUPPORT

DISCLOSURE

This invention relates generally as indicated to a box support and more particularly to a box bracket for use in mounting electrical boxes and the like in stud wall construction.

BACKGROUND OF THE INVENTION

Electrical box mounts for stud walls have been widely employed. Examples of such box mounts may be seen in prior U.S. Pat. Nos. 4,399,922; 4,569,485; 4,757,908; 4,753,361; and 4,603,739.

Typically box brackets are mounted to a stud and then an outlet box or junction box and a plaster ring are mounted to the bracket. The latter is usually accomplished by two or more fasteners fitted into up to eight holes or slots for securing different size boxes.

Such box brackets are quite heavy using a substantial amount of metal, are difficult to install properly, and may come in a variety of sizes for different size studs and/or boxes. Also such boxes are provided with knock-outs to provide conduit or wiring to or from the box. It is important that such knock-outs not be blocked, or if accommodated by knock-outs in the bracket, that the bracket not be weakened to the point of no longer supporting the box.

Accordingly it is desirable to have a box bracket or fastener which requires much less metal, is simpler of construction, and which is easier to install properly. It is also desirable that the box bracket fit a variety of stud size walls and properly support boxes of different sizes.

SUMMARY OF THE INVENTION

A box bracket for stud wall construction is formed from a single sheet metal strap which has one major transverse right angle bend forming a vertical leg and a horizontal leg with the vertical leg having a vertical offset overlapping the face of the stud while the horizontal leg extends in a horizontal plane over the top or bottom of the box and abuts the far wall panel. The horizontal and vertical legs are offset and the vertical leg is provided with a 45° gusset or panel which includes a keyhole opening and a slot, to each of which a different size box and plaster ring may be mounted. The vertical leg includes two spaced edge tabs or flanges between which a vertical edge of the box is wedged and grasped. The vertical leg also includes a triangular sight notch to facilitate the horizontal leveling of the various boxes in a wall system. The vertically extending offset in the vertical leg which overlaps the face of the stud may be provided with fastening holes to facilitate the fastening of the bracket to wood or metal studs. Such offset also significantly stiffens the vertical leg.

The horizontal leg or arm extends directly over the top (or bottom) of one side of the box and the major plane of such leg extends normal to the side of the stud. The leg includes an interior stiffening flange and an exterior U-shape knock-out opposite the flange. The knock-out would normally block one of the knock-outs in the top or bottom of the box. If such knock-out is employed, then the fitting used for the electrical conduit will clamp the horizontal leg to the box improving rigidity. The horizontal leg also has a series of pairs of short transverse slots which enable the distal end of the arm to be field bent to form a downturned flange at three different locations corresponding to the depth of a stud. In this manner the downturned flange abuts against the wall panel back of the box in a manner to accommodate three different standard stud depths.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary perspective view partially broken away of a box bracket of the present invention supporting a box and plaster ring from a stud;

FIG. 2 is a vertical section through the box showing the knock-out removed and a conduit fitting clamping the box and horizontal leg;

FIG. 3 is a horizontal section through the box and vertical leg taken from the line 3—3 of FIG. 2 showing the tabs grasping the box edge;

DETAILED DESCRIPTION OF THE PREFERRED EMBODIMENTS

Figure 4:
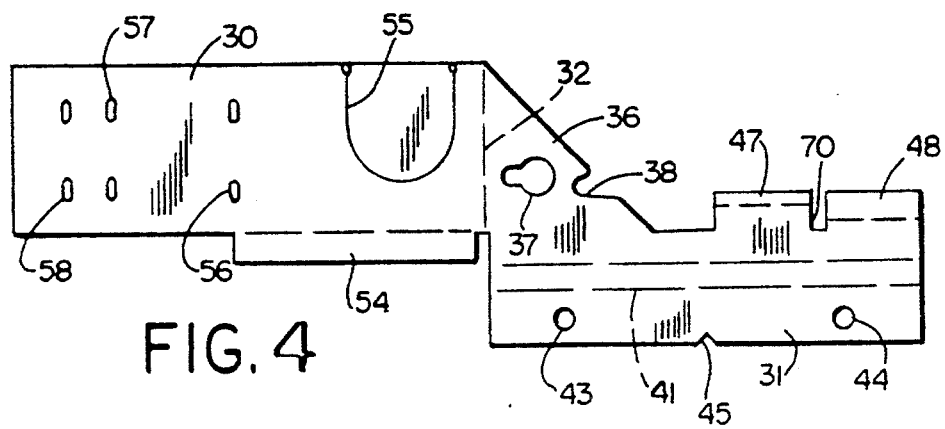
FIG. 4 is a plan view of the blank from which the bracket is formed illustrating the offset between the two legs.

Referring first to FIG. 1 there is illustrated a metal stud 10 of the type used in stud wall construction. The stud includes opposite faces 11 and 12 and a side 13. In conventional manner the wallboard such as gypsum boards are secured to the faces. The depth of the stud may vary. The present invention may also be used with wooden studs which have the same or similar rectangular configuration.

Also shown in FIG. 1 is a utility box 15 and a plaster ring 16 as well as the box support or mounting bracket 17 in accordance with the present invention.

The plaster ring 16 is secured to the open face of the box 15 by two diagonally opposed fasteners 20 and 21 with the former fastener 20 also securing both the box and plaster ring to the support 17. The support 17 is in turn secured to the stud by the fasteners 23 and 24. As with prior art box supports, when the fastener 20 is tightened, the box support is trapped between the box 15 and the plaster ring 16. However, in contrast to prior art box supports, only the single fastener 20 in the upper lefthand corner of the box illustrated is employed to secure the box and plaster ring to the box support in turn to be secured to the stud.

Referring now additionally to FIGS. 4–7 it will be seen that the box support 17 includes a horizontal leg 30 and a vertical leg 31 which are joined by a single right angle bend indicated at 32.

FIG. 4 which illustrates the blank before it is formed illustrates that the vertical leg and the horizontal leg of the box support are offset from each other with the right angle bend 32 being illustrated in dotted lines. At such right angle bend the vertical leg includes a triangular gusset or panel 36 which includes a keyhole opening 37 and a slot 38, either one of which is adapted to receive the fastener 20 depending upon the particular size box and plaster ring employed.

The vertical leg includes a vertically extending offset seen at 40 which extends the entire height of the vertical leg and provides an interior corner or shoulder 41 in which the corner of the stud nests and which provides an outwardly offset edge flange or panel 42 adapted to overlap the face 11 of the stud. The offset edge panel is provided with two holes indicated at 43 and 44 in FIG. 7 adapted to accommodate the fasteners 23 and 24, respectively. Such offset edge is also provided with a triangular notch seen in 45 which may be used visually with a mark on the stud to line properly a group of boxes. Such sighting notches are generally conventional and form per se no part of the present invention.

Figures 5, 6:
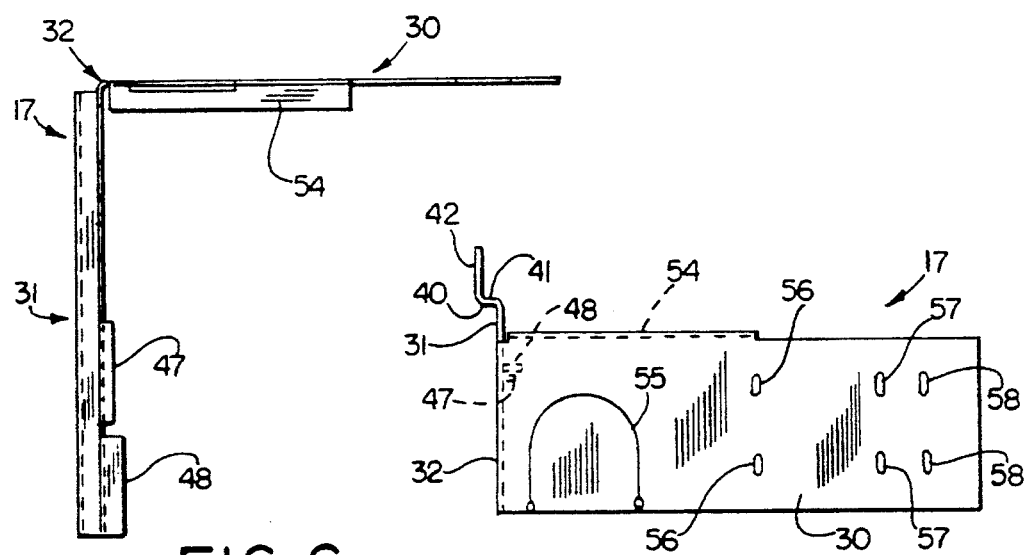
FIG. 5 is a top plan view of the finished bracket.
FIG. 6 is a side elevation of the bracket as seen from the bottom of FIG. 5.
Figure 7:
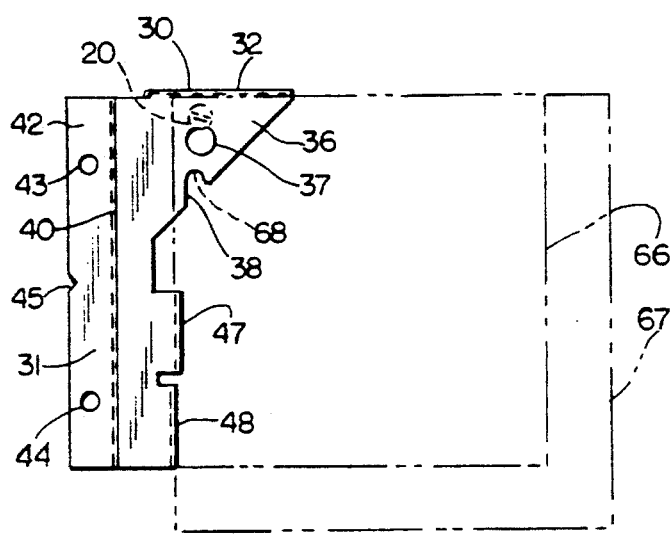
FIG. 7 is a front elevation of the bracket showing in phantom lines the two different size boxes which may be secured by the bracket.

The opposite edge of the vertical leg or the edge away from the stud is provided with two inturned right angle flanges or tabs seen at 47 and 48. Such tabs are shown in FIGS. 5, 6 and 7 and are shown gripping the box edge in FIGS. 1–3. Such tabs are horizontally and vertically offset with the horizontal spacing between the tabs being approximately the width of the box edge 50 seen in FIG. 3 so that such tabs may be forced over the box edge to confine the box edge therebetween.

Accordingly, even though one fastener is employed to secure the box and bracket together, the bracket provides two point support for the box, one point being at the fastener 20 and the other being along the lower front edge of the box adjacent the stud.

Referring now to the horizontal leg 30, it will be seen that such leg extends rearwardly from the top (or bottom) of the vertical leg along the side of the stud and is primarily in a plane perpendicular to the side of the stud. On the inner edge of the horizontal leg there is provided a downturned stiffening flange 54 and on the edge away from the stud opposite the flange there is provided a U-shape knock-out indicated at 55.

The horizontal leg or arm also includes a plurality of pairs of transverse slots indicated at 56, 57 and 58. Such paired notches created designed weaknesses which enable the horizontal leg to be field bent at such locations to form a downturned flange such as seen at 60 in FIGS. 1 and 2. The downturned flange will bear against the interior of the opposite wall board. The ability to field bend the horizontal leg at the different locations enables the box bracket to accommodate studs of different depths. The horizontal leg or arm then provides a support leg extending in a horizontal plane which resists rotation of the box about the stud.

It will be appreciated that in practice the bracket may be turned upside down so that the horizontal leg extends rearwardly beneath the box rather than on top of the box as illustrated in FIG. 1.

Since the horizontal leg may cover a knock-out in the box, the knock-out 55 is provided. In the event the knock-out is removed so that a conduit may exit the box, the conduit fitting seen at 62 in FIG. 2 includes a threaded portion 63 which projects through the knock-out of the bracket as well as the knock-out of the box and a nut 64 firmly clamps not only the conduit in place but also the box to the bracket.

As seen in FIG. 7, the two locations for the fastener 20 provided by the keyhole slot 37 and the slot 38 enable two different size boxes to be mounted by the bracket. The smaller box illustrated in phantom lines at 66 is secured in place by the fastener 20 in the small vertically radiating slot in the keyhole slot as illustrated. The larger box shown in phantom lines at 67 is secured in place by a fastener in the bight portion 68 of the slot 38. In addition to the single fastener, the vertical edges of both boxes will be gripped by the vertically and horizontally offset tabs 47 and 48. The two boxes illustrated in FIG. 7 may for example be a 4 inch box and a 4 $11/16$ inch box, respectively.

Referring now to FIG. 4 there is illustrated the blank prior to folding from which the bracket is made. The folding lines are illustrated in dotted lines with the various flanges or tabs being shown prior to folding. It is noted that the vertically offset tabs 47 and 48 are separated by the notch 70 to enable the two tabs to be folded separately and since the respective fold lines are offset, the upper tab 47 will be somewhat shorter than the lower tab 48.

The box support of the present invention performs the same task as prior art box supports but requires approximately 40% less material and moreover utilizes but a single fastener to secure the box and plaster ring to the box support. Both 4 inch and 4 $11/16$ inch boxes can be mounted with the illustrated embodiment. The rearwardly extending leg in a horizontal plane with the downturned flange provides a support leg to resist rotation of the box about the stud. The notch in the vertical leg of the stud provides an indicator to align the box support and the box on the stud. The notch is located so that the smaller or 4 inch box is centered on the notch.

Since the horizontal leg is adjacent the top or bottom of the box, the knock-out is provided so that the box support does not block one of the knock-outs provided in a standard 4 inch square utility box. If the knock-out is removed, the fitting used to attach the conduit to the box will firmly clamp the box support horizontally to the box thus maintaining and even improving rigidity. Even though a single fastener is employed to secure the box and bracket together, the stabilizing tabs on the inner edge of the vertical leg grip the lower edge of the box providing two point support. The downturned flange at the end of the horizontal leg also provides a reinforcing foot, such leg and foot resisting any horizontal pressure required to insert the fastener 20.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A box support for stud wall construction comprising a vertical leg having a front panel adapted to be secured to the face of the stud, and a horizontal leg extending rearwardly from the top of the front panel of the vertical leg, along the side of the stud, said horizontal leg being offset from the vertical leg and joined thereto by a gusset, means to secure an electrical outlet box and the like to the gusset, and means to field form flanges at different locations on the end of said horizontal leg whereby the box support will fit studs of different depths.

2. A box support as set forth in claim 1 including a vertically extending stiffening flange on one side of said horizontal leg toward the stud.

3. A box support as set forth in claim 2 including a U-shape knock-out in said horizontal leg opposite said stiffening flange.

4. A box support as set forth in claim 3 including means to secure a box to said gusset so that the top or bottom of the box is adjacent the horizontal leg, whereby if a conduit extends from said box through said knock-out, a conduit fitting for said conduit clamps said horizontal leg to the box.

5. A box support as set forth in claim 1 wherein said gusset is triangular and includes means to secure boxes of different sizes.

6. A box support as set forth in claim 5 wherein said vertical leg includes means to support a vertical edge of a box.

7. A box support as set forth in claim 5 wherein said vertical leg includes spaced tabs operative to support an edge of the box.

8. A box support as set forth in claim 1 including a vertically extending offset in said vertical leg stiffening said vertical leg and providing an interior shoulder against which to fit a corner of the stud.

9. A box support as set forth in claim 8 including a sighting notch on the edge of said vertical leg adapted to register with an elevation mark on the stud.

10. A box support for a stud wall comprising a vertical leg and a horizontal leg, said vertical leg being primarily in the plane of the face of the stud, and said horizontal leg being primarily in the plane perpendicular to the side of the stud, a single right angle horizontal bend joining the vertical and horizontal legs, said vertical leg being offset from said horizontal leg whereby a front panel portion of said vertical leg will overlap and be positioned for attachment to the face of the stud when the horizontal leg extends rearwardly along the side of the stud, said horizontal leg including means to field bend the end thereof at different locations to fit the length of the horizontal leg to the depth of the stud.

11. A box support as set forth in claim 12 including an offset vertical panel at said bend, and means to secure a box to said panel.

12. A box support as set forth in claim 11 wherein said panel includes means at at least two locations to secure boxes of different size thereto.

13. A box support as set forth in claim 11 including means on said vertical leg to grasp a vertical edge of the box.

14. A box support as set forth in claim 13 wherein said last mentioned means comprises spaced tabs on said vertical leg.

15. A box support as set forth in claim 14 including a vertically extending stiffening flange on the side of the leg toward the stud.

16. A box support as set forth in claim 15 including a U-shape knock-out in said horizontal leg opposite said stiffening flange.

17. A box support as set forth in claim 16 including a vertically extending stiffening flange on the side of the leg toward, the stud.

18. A box support as set forth in claim 17 including a U-shape knock-out in said horizontal leg opposite said stiffening flange.

19. A box support for stud wall construction comprising a vertical leg having a front panel adapted to be secured to the face of the stud, and a horizontal leg extending rearwardly from the top of the front panel of the vertical leg, along the side of the stud, said horizontal leg being offset from the vertical leg and joined thereto by a gusset, means to secure an electrical outlet box and the like to the gusset, said gusset being triangular and including means to secure boxes of different sizes, and said vertical leg including spaced tabs operative to support an edge of the box, said tabs being vertically and horizontally offset.

* * * * *